United States Patent
McAllister et al.

(10) Patent No.: US 6,389,843 B2
(45) Date of Patent: May 21, 2002

(54) RECEIVER DRYER WITH BOTTOM INLET

(75) Inventors: Neil J. McAllister; Cary Haramoto, both of Newark; William M. Mosher, Macedon, all of NY (US); Michael L. Ford, Baldwyn; Tom C. Wilson, Booneville, both of MS (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/776,975

(22) Filed: Feb. 5, 2001

Related U.S. Application Data

(60) Provisional application No. 60/181,349, filed on Feb. 9, 2000.

(51) Int. Cl.⁷ .................................................. F25B 39/04
(52) U.S. Cl. ............................. 62/509; 62/475; 62/503
(58) Field of Search ........................... 62/503, 509, 512, 62/513, 474, 475

(56) References Cited

U.S. PATENT DOCUMENTS

| | | |
|---|---|---|
| 421,017 A | 2/1890 | Stein |
| 1,743,406 A | 2/1930 | Sawyer |
| 2,579,053 A | 12/1951 | Schulstadt |
| 3,084,523 A | 4/1963 | Bottum et al. |
| 3,177,680 A | 4/1965 | Rasovich et al. |
| 3,412,574 A | 11/1968 | Reiter |
| 3,765,192 A | 10/1973 | Root |
| 4,072,615 A | 2/1978 | McConnell |
| 4,313,315 A | 2/1982 | Calderoni et al. |
| 4,429,544 A | 2/1984 | McCarty |
| 4,651,540 A | 3/1987 | Morse |
| 4,665,716 A | 5/1987 | Cochgran |
| 4,920,766 A | 5/1990 | Yamamoto et al. |
| 4,934,552 A | 6/1990 | Koide et al. |
| 5,038,582 A | 8/1991 | Takamatsu |
| 5,076,071 A | 12/1991 | Morse |
| 5,168,721 A | 12/1992 | Hancock et al. |
| 5,201,195 A | 4/1993 | Gavlak et al. |
| 5,201,792 A | 4/1993 | Study |
| 5,222,369 A | 6/1993 | Hancock et al. |
| 5,245,842 A | 9/1993 | Searfoss et al. |
| 5,282,370 A | 2/1994 | Kiblawi et al. |

(List continued on next page.)

FOREIGN PATENT DOCUMENTS

| | | |
|---|---|---|
| FR | 2 764 680 | 12/1998 |
| GB | 1 512 507 | 1/1975 |
| JP | 4-95522 | 3/1990 |

OTHER PUBLICATIONS

Prior art material of Parker–Hannifin Corporation publicly sold more than one year prior to the initial date of the subject application.

Copy of the International Search Report in corresponding PCT Application No. PCT/US01/03793.

Primary Examiner—William Doerrler
Assistant Examiner—Melvin Jones
(74) Attorney, Agent, or Firm—Christopher H. Hunter

(57) ABSTRACT

A receiver dryer includes a canister with a cylindrical sidewall, a lower end wall, and an open upper end. An inlet tube extends upwardly in the canister from an inlet port in the lower end wall. A desiccant tube assembly, comprising a pair of tubes, is received over the inlet tube, with the inlet tube being closely received in one of the tubes of the desiccant tube assembly. A lower baffle is formed unitary with the lower end of the desiccant tube assembly, and a lower filter pad is received over the desiccant tube assembly and against the lower baffle. Loose desiccant is then poured into the canister. An upper filter pad and upper baffle are received over the desiccant tube assembly. A pick-up tube, secured to an upper end cap, is then closely received in the other of the tubes of the desiccant tube assembly. The upper end cap is then secured to the upper end of the canister.

34 Claims, 5 Drawing Sheets

U.S. PATENT DOCUMENTS

| | | |
|---|---|---|
| 5,365,751 A | 11/1994 | Mikesell et al. |
| 5,419,157 A | 5/1995 | Kiblawi et al. |
| 5,515,696 A | 5/1996 | Hutchison |
| 5,580,451 A | 12/1996 | Tack |
| 5,596,881 A | 1/1997 | Wilson et al. |
| 5,596,882 A | 1/1997 | Hutchison et al. |
| 5,845,511 A * | 12/1998 | Okada et al. .................. 62/217 |
| 5,910,165 A | 6/1999 | Haramoto et al. |
| 6,125,651 A * | 10/2000 | Tack et al. ..................... 62/503 |
| 6,196,019 B1 * | 3/2001 | Higo et al. .................... 62/474 |

\* cited by examiner

RECEIVER DRYER WITH BOTTOM INLET

CROSS-REFERENCE TO RELATED CASES

The present application claims priority to U.S. Provisional Application Ser. No. 60/181,349; filed Feb. 9, 2000, which is incorporated herein by reference.

FIELD OF THE INVENTION

The present invention relates generally to receiver dryers for refrigeration and other air conditioning systems.

BACKGROUND OF THE INVENTION

A receiver dryer is a common component of a refrigeration (or more generally, air conditioning) system, and receives excess refrigerant in the cooling cycle, separates vapor refrigerant from liquid refrigerant, and removes water and particulate matter.

One type of receiver dryer includes a cylindrical canister with inlet and outlet fittings at an upper end which allow refrigerant to flow into and out of the canister. One of the fittings (typically the outlet fitting) is connected at its internal end to a pick-up tube, which extends downwardly through the canister to the lower end. Layers of filters and desiccant material surround the pick-up tube along its length. Refrigerant is directed into the inlet fitting and drains down through the filter pads and desiccant material to the bottom of the canister. The filter pads and desiccant material remove particles and other impurities from the refrigerant. The refrigerant then flows upwardly through the pick-up tube to the outlet fitting.

The desiccant material can be provided in a fabric bag, or can be loose. Fabric bags have some advantages as they are easy to assemble in the canister of the receiver dryer. Fabric bags, however are more expensive to manufacture, and do not allow flexibility in using the bags in a wide variety of applications. For example, each bag is designed for a specific application and has a predetermined volume, porosity, material and desiccant composition, etc. To change the structure, material or composition of the desiccant bag for other applications, new bags typically must be manufactured. This can require tooling changes and ordering of new fabric and desiccant material, all of which can be time-consuming and expensive. Stocks of different sizes and types of desiccant bags also typically have to be kept on hand which can increase storage and inventory costs, and hence the over-all cost of the receiver/dryer.

In some applications it is therefor desirable to use loose desiccant material for the receiver dryer. Such loose desiccant material can be less expensive to purchase and is easily adaptable to a wide variety of applications (i.e., does not have restrictions as to form or composition). The desiccant can just be added (poured) into the canister in the desired amount, with no additional labor or material costs.

In using loose desiccant material, however, it can be difficult to assemble the receiver dryer. The lower end wall of the receiver dryer is typically initially secured to or formed in one piece with the lower end of the canister. The pick-up tube is typically pre-assembled with the upper end cap, however, in so doing, the desiccant must be introduced into the canister before the pick-up tube and end cap subassembly is installed, or else the end cap blocks the easy filling of the canister, as well as the introduction of components such as the upper baffle and filter pad. It can be difficult (or even impossible) to introduce the pick-up tube into the canister when the loose desiccant is randomly dispersed in the canister, as it is not desirable to force the pick-up tube through the loose desiccant material. The desiccant can also flow through the pick-up tube opening in the lower baffle before the pick-up tube is inserted into the canister, and thus enter the lower, quiescent area of the receiver/dryer.

One solution is shown and described in U.S. Pat. No. 5,910,165, where the loose desiccant is poured into the receiver dryer after a lower baffle, filter pad and a short desiccant tube are assembled in the canister. The lower baffle and filter pad closely surround the desiccant tube in fluid-tight relation thereto. The baffle and desiccant tube can also be formed together in one piece (unitary). An upper filter pad and baffle are then located in the canister, in fluid-tight relation to the desiccant tube, to enclose the loose desiccant. The pick-up tube, attached to the upper end cap, is then inserted through the desiccant tube and the upper end cap is then secured (welded, soldered, etc.) to the open end of the canister.

U.S. Pat. No. 5,910,165 describes inlet and outlet ports formed in the upper end cap. It is believed that in some applications, it would be necessary or desirable to have at least the inlet port formed in the lower end wall. This can be due to space requirements or plumbing of the liquid lines. While some refrigeration devices with bottom inlets are known (see, e.g., Rasovich, U.S. Pat. No. 3,177,689; and Cochran, U.S. Pat. No. 4,665,716), it is believed that such devices have had certain drawbacks, and none provide a receiver dryer with sufficient filtering and water removal capabilities for many current applications.

Moreover, providing a receiver dryer with a bottom inlet requires an inlet tube to direct the refrigerant to the upper portion of the canister, where the refrigerant can then drain down through the filter pads, baffles and desiccant to the lower end of the canister, where it is then drawn out through the pick-up tube. In so doing, however, similar issues arise in pouring the loose desiccant material into the receiver dryer during assembly.

Thus, it is believed that there is a demand for a further improved receiver dryer having a bottom inlet with improved removal of particles and other impurities. Still further, it is believed that there is a demand for a receiver dryer with a bottom inlet which can accept loose desiccant material to reduce the cost of the receiver dryer, and which is still easy and cost effective to assemble.

SUMMARY OF THE PRESENT INVENTION

The present invention provides a new and unique receiver dryer with a bottom inlet, which accepts loose desiccant material. The receiver dryer is simple to assemble and cost-effective to produce.

According to the present invention, the receiver dryer has a canister with a lower end wall. The lower end wall can be formed in one piece (unitary) with the sidewall of the canister by drawing, impacting spinning, or other appropriate forming of the canister, or can be a separate piece secured to the sidewall of the canister such as by welding, soldering, etc. An inlet port is provided in the lower end wall, and an inlet tube is fluidly sealed to the inlet port. The inlet tube extends inwardly in the canister to a point near the upper end of the canister. The inlet tube can also extend through the inlet port exteriorly to the canister, or can be formed in one piece (unitary) with the lower end wall.

A desiccant tube assembly, having a pair of relatively short, longitudinally-extending, adjacent tubes, is then located over the inlet tube, toward the lower end of the canister. The inlet tube is received within a first of the tubes of the desiccant tube assembly, and has a fluid-tight seal therewith. A circular lower baffle is provided at the lower end of the desiccant tube assembly. The baffle is preferably formed together (e.g., molded) in one piece (unitary) with the lower end of the desiccant tube assembly, although it can also be a separate component secured to the desiccant tube assembly in an appropriate manner. The baffle preferably has a fluid-tight seal with the interior sidewall of the canister. A circular lower filter pad, with a pair of openings for the desiccant tubes, is supported against the lower baffle. Loose desiccant is then poured into the canister in the desired amount, and is supported by the lower baffle and filter pad.

An upper circular filter pad and baffle, both of which also have a pair of openings for the desiccant tube assembly, support the upper end of the desiccant material. The upper baffle also preferably has a fluid-tight seal with the desiccant tube assembly and the canister. The upper and lower baffles (and filter pads) prevent vibration or movement of the desiccant material.

An upper end cap, with a pick-up tube secured thereto, is then assembled with the canister. The pick-up tube can be crimped, coined, staked or otherwise secured to the upper end cap, or can be formed together with the end cap in one piece (unitary). The pick-up tube is inserted into the other opening in the upper baffle, filter pads and through the other tube of the desiccant tube assembly. The pick-up tube also preferably has a fluid-tight seal with the desiccant tube. The upper end cap is then secured to the canister with a fluid-tight seal, such as by brazing, welding, soldering, etc.

The pick-up tube can be bent or curved, such that the lower end of the pick-up tube is aligned with the desiccant tube, but the upper end is connected in an off-center relation to the end cap. This allows flexibility in connecting exterior components to the end cap. The inlet tube can have the same configuration as the pick-up tube. The upper end cap and pick-up tube can also be first secured to the canister sidewalls, and the desiccant material poured in from the bottom of the receiver dryer (when inverted) before the lower end cap and inlet tube are secured to the canister sidewall. This provides flexibility in assembling the receiver dryer.

As described above, the present invention provides a receiver dryer with a bottom inlet which is simple and cost-effective to manufacture. Loose desiccant material, rather than desiccant bags, can be used with the receiver dryer, which reduces the over-all cost of the receiver dryer and provides flexibility in tailoring the amount, composition, etc. of desiccant material to the particular application.

Further features of the present invention will become apparent to those skilled in the art upon reviewing the following specification and attached drawings.

DETAILED DESCRIPTION OF THE PREFERRED EMBODIMENT

Figure 1:
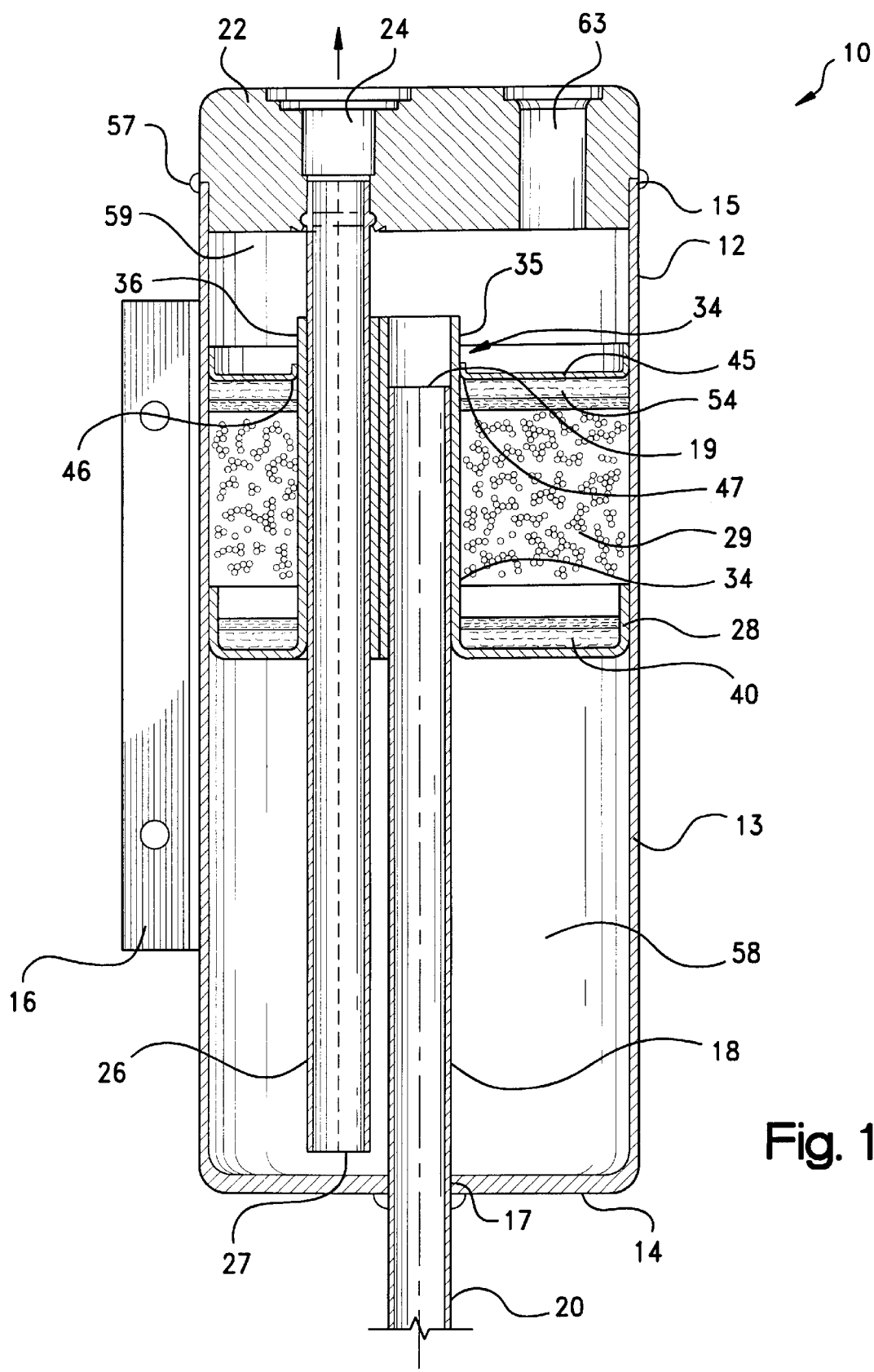
FIG. 1 is a cross-sectional side view of a receiver dryer constructed according to the principles of the present invention.

Referring to the drawings, and initially to FIGS. 1–4, a receiver dryer constructed according to the principles of the present invention is indicated generally at 10. The receiver dryer includes a cylindrical canister 12 having a sidewall 13 with a lower end wall 14 and an upper open end 15. The canister 12 includes a flange or bracket 16 that allows the canister to be secured to an appropriate location in the refrigeration system. Canister 12 is preferably formed from an appropriate material, such as aluminum or steel, and, as illustrated in FIG. 1, the lower end wall 14 is preferably formed in one piece with the sidewall such as by drawing, impacting or spin- forming the lower end of the sidewall. The techniques for forming aluminum (or other metals) by the above methods are known to those skilled in the art.

The lower end wall 14 includes an inlet port 17, which is illustrated as being located toward the center of the wall, although it could also be off-center. An inlet tube 18 extends through port 17, to a point where the outlet end 19 of the inlet tube is close to the upper end of the canister. The inlet end 20 of the inlet tube is externally accessible and can be plumbed within the fluid lines of the refrigeration system. The inlet tube is fluidly sealed within port 17, such as by welding, brazing, soldering, etc. the tube to the end wall surrounding the opening. Inlet tube 18 is also formed from appropriate material, such as aluminum.

The receiver dryer further includes an upper end cap 22, which is also formed from an appropriate material, such as aluminum or steel, and is secured to the open end 16 of the canister such as by welding, brazing, soldering, etc. The upper end cap 22 includes an outlet port 24. A pick-up tube 26 is fluidly sealed to the outlet port 24 of the upper end cap, and extends downwardly through the receiver dryer to an inlet end 27 located proximate the lower end wall 14. It is noted that the outlet port 24 and inlet port 17 could also be reversed in particular applications, i.e., the inlet port could be connected to the pick-up tube 26 while the outlet port could be connected to the inlet tube 18, and the present invention is not intended to be limited to either passage being for "inlet" or "outlet" refrigerant flow. However, in most applications, the inlet port will be connected to the inlet tube to direct refrigerant into the upper end of the receiver dryer, while the outlet port will be connected to the pick-up tube 26 to direct refrigerant out from the lower end of the receiver dryer.

Pick-up tube 26 can be secured to upper end cap 22 in any appropriate manner, such as by crimping, staking or coining. One preferred technique is shown in U.S. Pat. No. 5,596,881, owned by the assignee of the present invention and incorporated herein by reference, where a pick-up tube can be secured to an end cap without additional seals by staking a portion of the end cap surrounding a bead on the pick-up tube. Another technique is shown in U.S. Pat. No. 5,910,165, also owned by the assignee of the present invention and incorporated herein by reference, where an O-seal can be located in a groove in the end of the pickup tube for providing a fluid-tight seal with the end cap. In this technique, the opposite, inlet end of the pick-up tube has a wedge shape and contacts the lower end wall. Either of these techniques could be used in the present invention, although, again, other techniques could be used. The pick-up tube 26 can also be formed in one piece (unitary) with the upper end cap 22.

Figure 3:
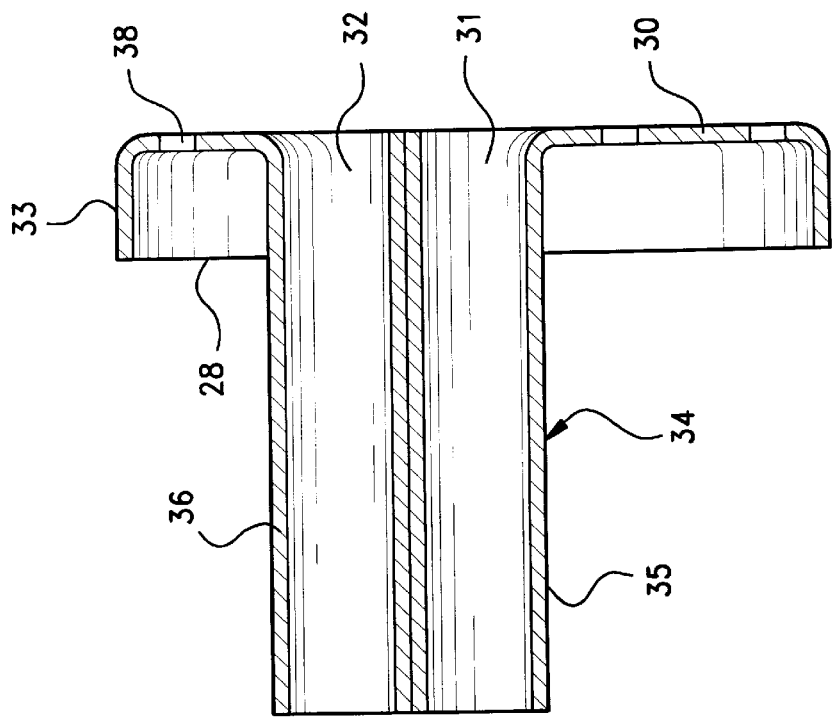
FIG. 3 is a cross-sectional view of the baffle of FIG. 2 taken substantially along the plane described by the lines 3—3 in FIG. 2.
Figure 2:
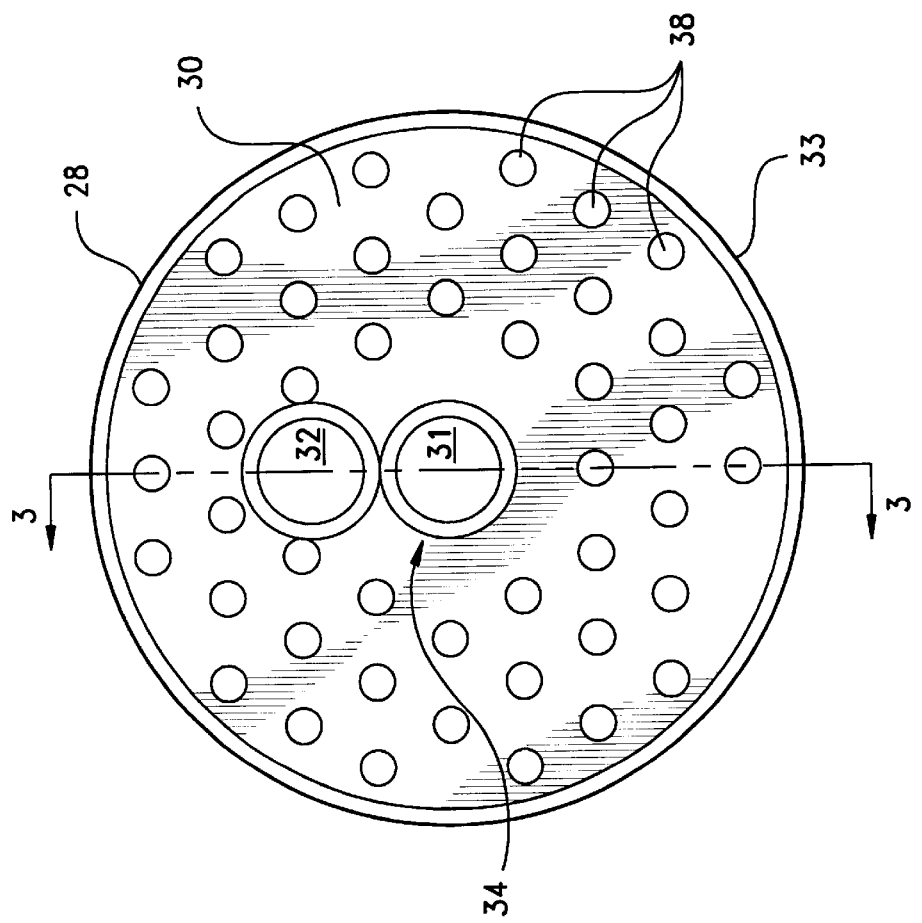
FIG. 2 is a plan view of a baffle and desiccant tube for the receiver dryer of FIG. 1.

As shown in FIGS. 1, 2 and 3, the receiver dryer includes a lower or downstream annular baffle 28 that supports desiccant material 29. Lower baffle 28 has a flat circular body 30 defining a pair of openings 31, 32, and an outer annular collar or flange 33 extending around the periphery of the body. The outer flange 33 extends upwardly from body 30, and preferably closely matches the inner diameter of canister sidewall 13, such that the outer flange is fluidly-sealed with at least a slip-fit (press-fit if possible) to the sidewall.

A desiccant tube assembly, indicated generally at 34, also extends upwardly from the baffle 28. Desiccant tube assembly 34 includes a first tube 35 bounding opening 31, and a second tube 36 bounding opening 32. The tubes 35, 36 preferably extend adjacent one another, longitudinally along, or at least parallel to, the central axis of the canister, although the tubes could also be radially spaced apart from each other in appropriate applications. Tubes 35, 36 can be formed in one piece (such as through molding) with baffle body 30, although the desiccant tubes could also be formed as separate components and later secured to the body in an appropriate manner (such as with adhesive). Resort may be had to U.S. Pat. No. 5,910,165 for techniques for attaching a separate desiccant tube to a baffle. The desiccant tube assembly 34 and baffle 28 are preferably formed from appropriate material, such as metal (e.g., aluminum or steel) or plastic.

A plurality of perforations or openings, for example as indicated at 38, are formed in the flat body 25 of baffle 23 to allow fluid flow therethrough.

The inlet tube 18 is received in the second tube 36 of the desiccant tube assembly. The inner diameter of the desiccant tube 36 can be easily and closely controlled to closely and sealingly receive the inlet tube.

Figure 4:
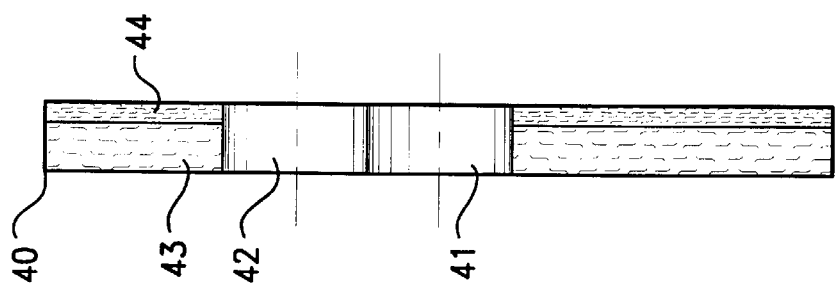
FIG. 4 is a cross-sectional side view of a filter pad for the receiver dryer of FIG.1.

A lower circular filter pad 40 is received over the desiccant tubes 35, 36 and against the upstream surface of lower baffle 28. Filter pad 40 prevents migration of desiccant material 29 through lower baffle 28, and provides filtration of refrigerant flowing therethrough. As shown in FIG. 4, filter pad 40 includes a pair of openings 41, 42 which receive tubes 35, 36 of the desiccant assembly, and the filter pad 40 extends radially between desiccant tubas 35, 36 and outer flange 33 on baffle 28. The filter pad preferably has a lower, more porous (less dense) layer 43 in contact with baffle 28, and an upper, less porous (more dense) layer 44 facing away from baffle 28. Filter pad 40 is formed of an appropriate porous material, for example fiberglass. It is noted that the lower baffle 28 may be formed with small enough openings that in some applications the lower filter pad 40 may not be necessary.

Referring again to FIG. 1, desiccant material 24 is preferably a conventional desiccant which is available from a number of sources. For example, an appropriate desiccant material is manufactured by UOP under the trademarks/designations XH7 and XH9. Other types of desiccant material can of course be used, and it is noted that the present invention is primarily directed toward a "loose-fill" desiccant, that is, a desiccant which is not contained within any bag, but is rather in a loose state and constrained only by the interior surface of the sidewall of the canister and the upper and lower baffles (and filter pads). Such loose-fill desiccant tends to be less expensive than desiccant material which is available in a bag form, although it should be apparent that desiccant in a bag form could of course be used with die present invention, although more expensive. The amount of desiccant necessary for the receiver/dryer depends on the particular application and can be easily determined by those skilled in the art. The present invention has the flexibility to use different volumes or compositions of desiccant material in a simple and easy manner by merely filling the canister to the desired level. The receiver/dryer is not limited to a particular volume or composition of desiccant, and can be used in different applications without having to order or stock desiccant bags of different volumes, sizes or composition.

An upper annular baffle 45 also supports the desiccant material. The upper annular baffle 45 preferably has the same construction as the lower baffle 28, with the only difference being that the upper baffle has a pair of openings 46, 47 to receive the tubes 35, 36 of the desiccant tube assembly. The baffle 45 has at least a slip fit (press-fit is possible) with the sidewall of the canister, and a slip-fit (press-fit if possible) with the desiccant tubes to provide a fluid-tight seal therewith.

An upper circular filter pad 54 is provided against the lower surface of upper baffle 45 to prevent migration of desiccant material through the baffle, and for filtration of refrigerant flowing therethrough. Filter pad 54 preferably has the same configuration and is formed from the same material as lower pad 40, and includes a pair of openings to receive desiccant tubes 35, 36. The upper and lower baffles and filter pads) securely hold the desiccant material to prevent undesirable movement or vibration thereof during use.

After the baffles, filter pads and desiccant are loaded into the receiver dryer, the upper end cap 22 and pick-up tube 26 are installed. The pick-up tube 26 is received with a slip-fit (preferably a press-fit) within the first tube 35 of the desiccant tube assembly for a fluid-tight seal therewith. The end cap 22 is then fluidly sealed to the sidewall 13 of the canister such as by welding, brazing, soldering, etc., such as at 57.

During assembly, lower baffle 28 and desiccant tube assembly 34 arc inserted first into canister 12. The lower surface of baffle 28 faces the lower end wall of the receiver dryer and, together with the lower end wall, defines a quiescent chamber 58. Lower filter pad 40 is then located against lower baffle 28. Desiccant 29 is then introduced (poured) into the canister. The upper filter pad 54 and upper baffle 45 are then introduced into the canister to support the upper end of the desiccant material 29. The upper surface of baffle 45 faces the upper end of the canister, and together with the end cap 22 (when installed), defines an upper fluid chamber 59. With the press-fit between desiccant tube assembly, inlet tube 18 and pick-up tube 26; and the tight fit between the upper baffle 45 and the desiccant tube assembly and the canister sidewall, essentially a fluid-tight seal is provided entirely across the baffles, inlet tube and pick-up tube without any additional sealing components such as gaskets, rings, etc. being required.

The receiver dryer is then fluidly connected within the refrigeration system in a conventional manner, and refrigerant is introduced (typically from the condenser) through the inlet tube 18 to the upper chamber 59 of the canister, where the refrigerant then drains down through the baffles, filter pads and desiccant material, where water and particulate matter is removed, to the quiescent chamber 58. Refrigerant is then drawn upward through the pick-up tube 26 and directed through the outlet to the refrigeration system (typically to the expansion device).

Figure 5:
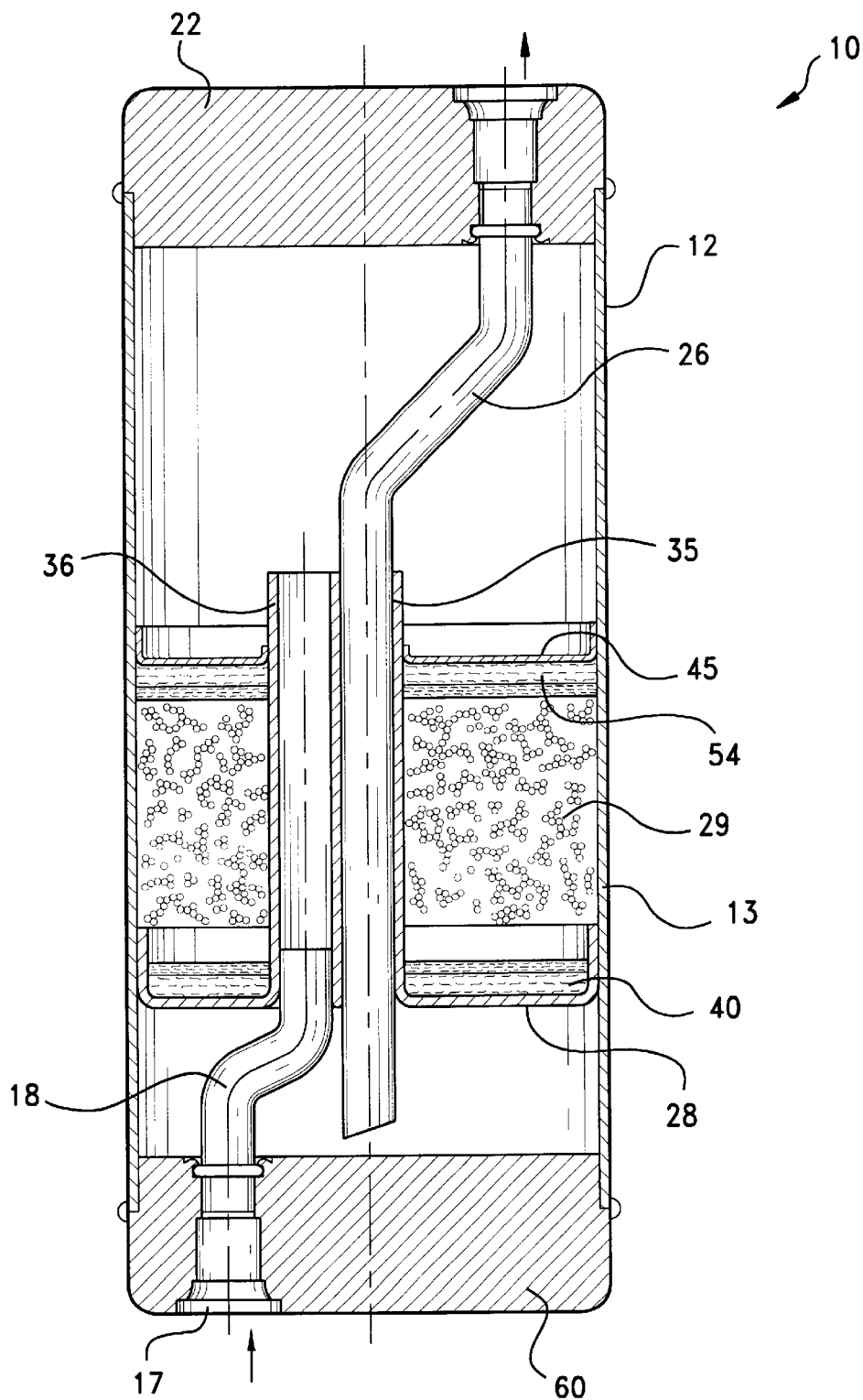
FIG. 5 is a cross-sectional side view of a receiver dryer constructed according to a further form of the present invention.

Referring now to FIG. 5, a further form of the invention is shown where a separate lower end wall 60 is provided. This is an alternative to the unitary end wall shown in FIG. 1 and allows the receiver dryer to be bottom loaded. The lower end wall 60 can be secured to the canister sidewall 13 in the same manner as described above with respect to securing upper end cap 22 to sidewall 13 (e.g., by welding, solder, brazing, etc.). In FIG. 5, the inlet tube 18 is located entirely within the receiver dryer, and is fluidly sealed to port 17 internally of the canister. The inlet tube 18 can be secured to lower end wall 60 in the same manner as described above with respect to pick-up tube 26 and upper end cap 22 (e.g., by staking, coining, crimping, etc.). If the receiver dryer is to be bottom-loaded, the desiccant tube assembly is provided integral (preferably in one piece) with the upper baffle 45, rather than with the lower baffle 28, and extends downwardly within the canister. The receiver dryer is inverted, and the upper end cap 22 is first secured to the canister sidewall 13. The baffles, filters, desiccant tube assembly and desiccant are then assembled in the reverse order described above. The lower end cap 60 is then secured to the canister sidewall after all the other components have been assembled.

Also, in FIG. 5, it is illustrated that the inlet tube 18 and pick-up tube 26 can be bent and connected off-center to the respective end walls 60, 22. This allows flexibility in attaching exterior components on the ends of the receiver dryer. All other aspects of the receiver dryer in FIG. 5 are preferably the same as described above with respect to FIG. 1.

Figure 7:
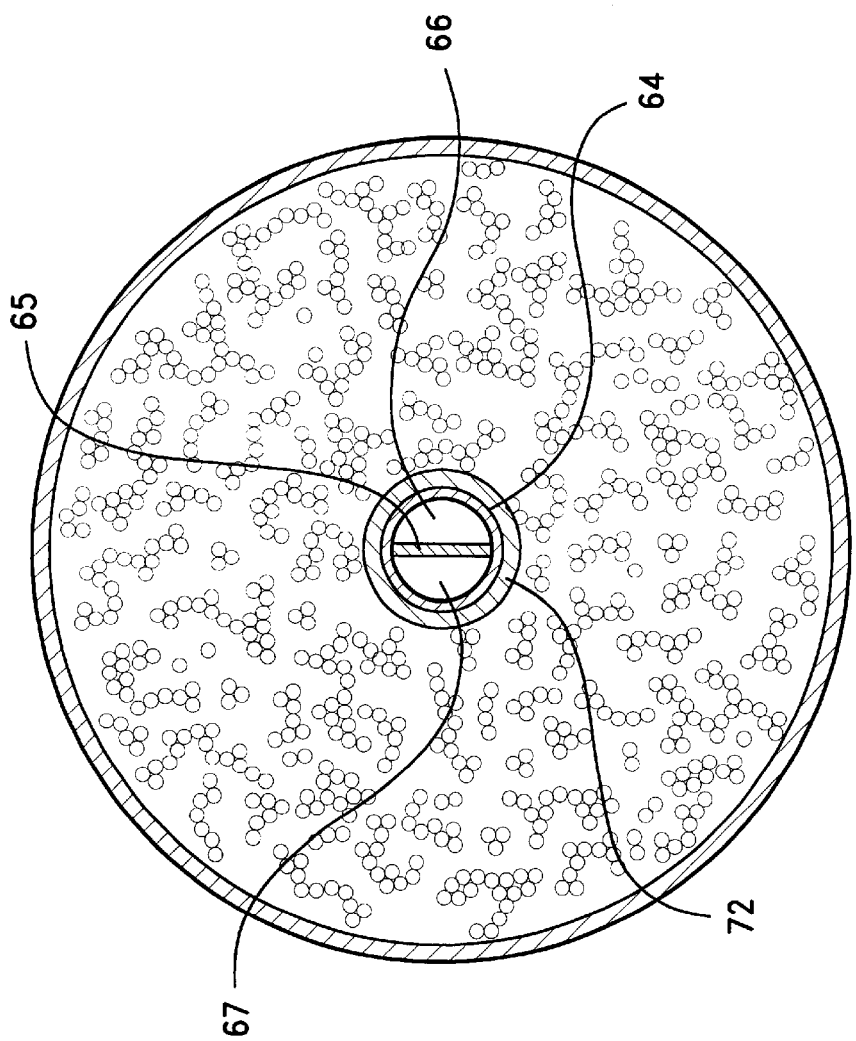
FIG. 7 is a cross-sectional end view of the receiver dryer taken substantially along the plane described by the lines 7—7 of FIG. 6.
Figure 6:
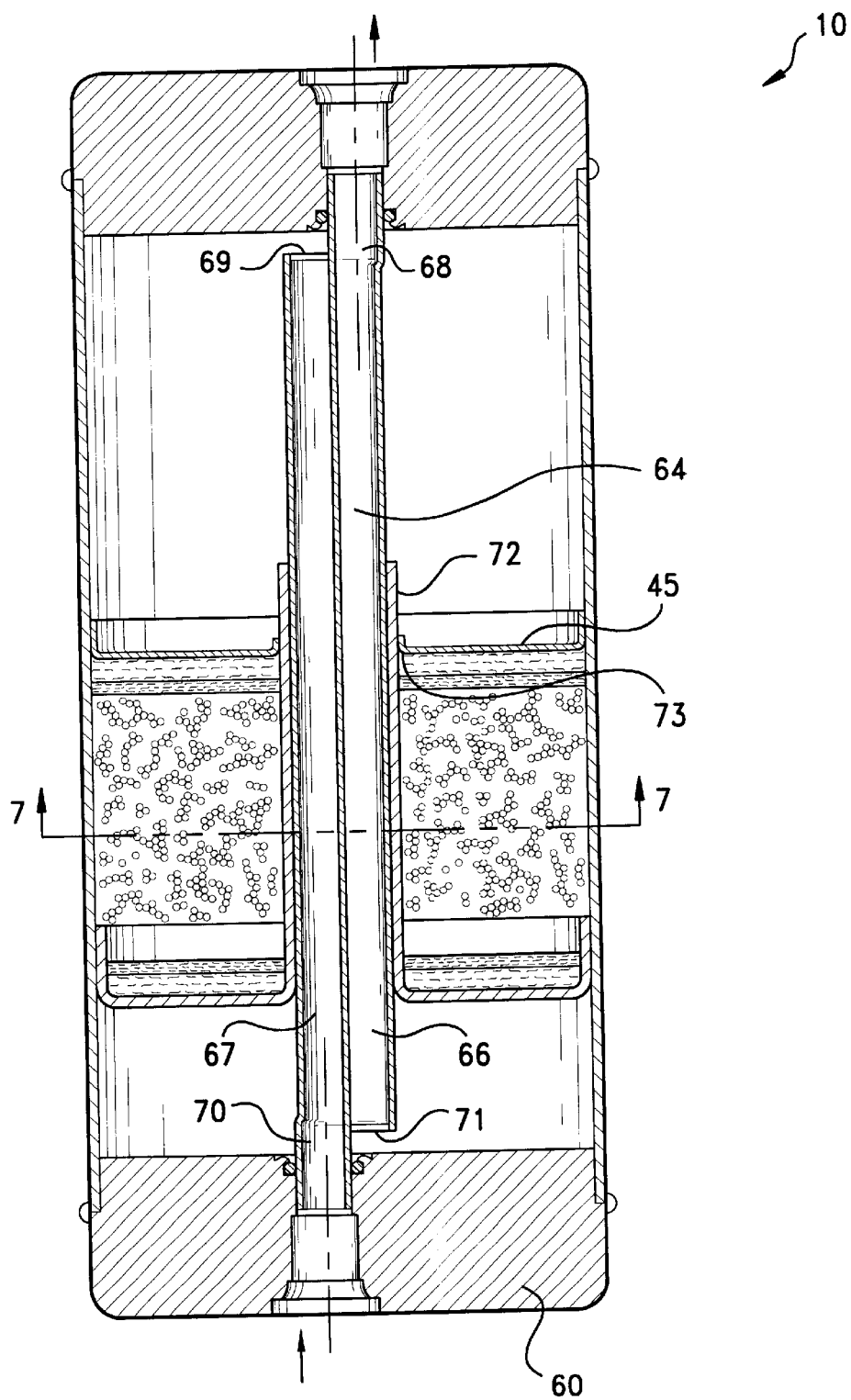
FIG. 6 is a cross-sectional side view of a receiver dryer constructed according to a still further form of the present invention.

Referring now to FIGS. 6 and 7, a still further form of the present invention is shown, where the inlet tube and pick-up tube have at least a portion that is formed together in one piece (unitary). In this form, a single conduit 64 can be provided which is bisected down its length by a wall 65 into a pick-up tube passage 66 and a inlet tube passage 67. Pick-up tube passage 66 has an inlet port 71, and a portion 68 that extends upwardly into upper end cap 22 and is secured to upper end cap 22 in a manner such as described previously. The inlet tube passage 67 likewise has an outlet port 69, and a portion 70 that extends downwardly into lower end wall 60, and is secured to lower end wall 60 in a manner such as described previously. The desiccant tube assembly 44 only includes a single tube 72 to closely surround conduit 64 in a fluid-tight manner. Tube 72 upwardly extends through a single opening 73 in upper baffle 45. All other aspects of this receiver dryer are preferably the same as described above with respect to the receiver dryers shown in FIGS. 1 and 5.

Thus, as described above, the present invention provides a new and unique receiver dryer with a bottom inlet which is simple and cost-effective to manufacture. The receiver dryer is particularly useful with loose desiccant material.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A receiver dryer, comprising:
   a canister having a longitudinally-extending cylindrical sidewall, a lower end wall integral with a lower end of said canister and an opening at an upper end of said canister, said lower end wall having an inlet port;
   an end cap secured to the upper end of the canister, said end cap having an outlet port;
   an inlet tube fluidly connected to the inlet port in the lower end wall and extending upwardly to an outlet port at the upper end of the canister;
   a pick-up tube fluidly connected to the outlet port in the end cap and extending downwardly to an inlet port at the lower end of the canister;
   a desiccant tube assembly supported within said canister, said desiccant tube assembly including a pair of longitudinally extending tubes, one of said desiccant tubes closely receiving the inlet tube, and the other of said desiccant tubes closely receiving the pick-up tube;
   a first baffle having a peripheral dimension closely matching an interior dimension of said sidewall, said first baffle having a first opening which is bounded by said one of said tubes of the desiccant tube assembly and a second opening which is bounded by the other of said tubes of said desiccant tube assembly;
   a second baffle having a peripheral dimension closely matching the interior dimension of said sidewall and a first opening fluidly-scaled to said one tube of said desiccant tube assembly, and a second opening fluidly-scaled to the other of said tubes of the desiccant tube assembly;
   loose desiccant material disposed in said canister and surrounding said desiccant tube assembly between said first and second baffles.

2. The receiver dryer as in claim 1, wherein said desiccant material is supported directly against an interior surface of said canister sidewall.

3. The receiver dryer as in claim 1, wherein said lower end wall is unitary with said sidewall.

4. The receiver dryer as in claim 1, wherein the lower end wall is a separate piece from said sidewall.

5. The receiver dryer as in claim 1, wherein said first baffle and said desiccant tube assembly are formed unitary in one piece together.

6. The receiver dryer as in claim 1, wherein said first baffle is disposed toward the lower end of the canister, and said second baffle is disposed toward the upper end of the canister.

7. The receiver dryer as in claim 1, wherein the first and second desiccant tubes are in adjacent relation to one another.

8. The receiver dryer as in claim 1, wherein said inlet tube and pick-up tube share a common conduit.

9. The receiver dryer as in claim 8, wherein the conduit is bisected down its length by a wall into an inlet tube passage and a pick-up tube passage.

10. The receiver dryer as in claim 1, further including a filter pad located between each of the first and second baffles and the desiccant material.

11. A receiver dryer, comprising:
    a canister having a longitudinally-extending cylindrical sidewall, a lower end wall integral with a lower end of said canister and an opening at an upper end of said canister, said lower end wall having an inlet port;
    an end cap secured to the upper end of the canister, said end cap having an outlet port;
    a conduit including an inlet tube passage and a pick-up tube passage, said inlet tube passage fluidly connected to the inlet port in the lower end wall and extending upwardly toward the upper end of the canister, and said pick-up tube passage fluidly connected to the outlet port in the end cap and extending downwardly toward the lower end of the canister;

a desiccant tube assembly supported within said canister, said desiccant tube assembly including a longitudinally extending tube, said desiccant tube closely receiving the conduit;

a first baffle having a peripheral dimension closely matching an interior dimension of said sidewall, said first baffle having a first opening which is bounded by said tube of the desiccant tube assembly;

a second baffle having a peripheral dimension closely matching the interior dimension of said sidewall and a first opening fluidly-scaled to said tube of said desiccant tube assembly;

loose desiccant material disposed in said canister and surrounding said desiccant tube assembly between said first and second baffles.

12. The receiver dryer as in claim 11, wherein said desiccant material is supported directly against an interior surface of said canister sidewall.

13. The receiver dryer as in claim 11, wherein said first baffle and said desiccant tube assembly are formed unitary in one piece together.

14. The receiver dryer as in claim 11, wherein said first baffle is disposed toward the lower end of the canister, and said second baffle is disposed toward the upper end of the canister.

15. The receiver dryer as in claim 11, wherein the conduit is bisected down its length by a wall into the inlet tube passage and the pick-up tube passage.

16. The receiver dryer as in claim 1, further including a filter pad located between each of the first and second baffles and the desiccant material.

17. A receiver dryer, comprising:

a canister having a longitudinally-extending cylindrical sidewall, an end wall secured to a first, closed end of said canister and an end cap secured to a second, open end of the canister, said end wall having a first port and said end cap having a second port;

a first tube fluidly connected to the first port in the end wall and extending toward the open end of the canister to a first port;

a second tube fluidly connected to the second port in the end cap and extending toward the closed end of the canister to a second port;

a desiccant tube assembly supported within said canister, said desiccant tube assembly including a longitudinally extending desiccant tube, said first and second tubes being received in said desiccant tube;

a first baffle having a peripheral dimension closely matching an interior dimension of said sidewall and an inner dimension fluidly sealed to the desiccant tube assembly;

a second baffle having a peripheral dimension closely matching the interior dimension of said sidewall and an inner dimension secured to the desiccant tube assembly;

desiccant material disposed in said canister and surrounding said desiccant tube assembly between said first and second baffles.

18. The receiver dryer as in claim 17, wherein the desiccant is a loose desiccant material.

19. The receiver dryer as in claim 18, wherein said desiccant material is supported directly against an interior surface of said canister sidewall.

20. The receiver dryer as in claim 17, wherein said end wall is unitary with said sidewall.

21. The receiver dryer as in claim 17, wherein the end wall is a separate piece from said sidewall.

22. The receiver dryer as in claim 17, wherein said first baffle and said desiccant tube assembly are formed unitary in one piece together.

23. The receiver dryer as in claim 17, wherein said first baffle is disposed toward the closed end of the canister, and said second baffle is disposed toward the open end of the canister.

24. The receiver dryer as in claim 17, wherein said first tube and said second tube share a common conduit.

25. The receiver dryer as in claim 24, wherein the conduit is bisected down its length by a wall into an inlet tube passage and a pick-up tube passage.

26. The receiver dryer as in claim 17, further including a filter pad located between each of the first and second baffles and the desiccant material.

27. The receiver dryer as in claim 17, wherein said desiccant tube assembly comprises a pair of longitudinally-extending desiccant tubes, one of said desiccant tubes closely receiving said first tube, and the other of said desiccant tubes closely receiving the second tube.

28. The receiver dryer as in claim 27, wherein the first and second desiccant tubes are in adjacent relation to one another.

29. A method for assembling a receiver/dryer, comprising the steps of:

providing a canister having a longitudinally-extending cylindrical sidewall, a closure member secured to one end of said sidewall and an opening at another end of said sidewall;

providing a first baffle in fluid-tight surrounding relation to a desiccant tube assembly, said desiccant tube assembly having a pair of desiccant tubes;

inserting the desiccant tube assembly and the first baffle into the canister through the open end, with a first surface of said baffle facing said closed end of said canister and said periphery of said first baffle being closely received in said canister;

locating loose desiccant in said canister, said loose desiccant being supported by a second surface of said first baffle; inserting a second baffle with an opening over the desiccant tube assembly, with the desiccant tube assembly being received in said opening in the second baffle, and a first surface of the second baffle supporting the loose desiccant material and said periphery of said second baffle being closely received in said canister;

inserting a first tube into one of the tubes of the desiccant tube assembly, said first tube being fluidly connected to an opening in the closed end of the canister, said desiccant tube assembly and said first tube having a fluid-tight seal; and attaching an end cap to the open end of said canister, said end cap having at least one fluid flow opening extending through the end cap, and a second tube fluidly connected to the opening in the end cap, said second tube being received within the other of the tubes of said desiccant tube assembly with a fluid-tight seal.

30. The method as in claim 29, wherein said first tube is secured to said closed end prior to the desiccant being introduced into die canister, and said end cap is secured to said canister after the desiccant is introduced into the canister.

31. A method for assembling a receiver/dryer, comprising the steps of:
   providing a canister having a longitudinally-extending cylindrical sidewall, a closure member secured to one end of said sidewall and an opening at another end of said sidewall;
   providing a first baffle in fluid-tight surrounding relation to a desiccant tube assembly, said desiccant tube assembly having a desiccant tube;
   inserting the desiccant tube assembly and the first baffle into the canister through the open end, with a first surface of said baffle facing said closed end of said canister and said periphery of said first baffle being closely received in said canister;
   locating loose desiccant in said canister, said loose desiccant being supported by a second surface of said first baffle; inserting a second baffle with an opening over the desiccant tube assembly, with the desiccant tube assembly being received in said opening in the second baffle, and a first surface of the second baffle supporting the loose desiccant material and said periphery of said second baffle being closely received in said canister;
   inserting a conduit into the tube of the desiccant tube assembly, said conduit being fluidly connected to an opening in the closed end of the canister, said desiccant tube assembly and said conduit having a fluid-tight seal; and
   attaching an end cap to the open end of said canister, said end cap having at least one fluid flow opening extending through the end cap, said conduit being fluidly connected to the opening in the end cap, said conduit being received within said tube of said desiccant tube assembly with a fluid-tight seal.

32. A method for assembling a receiver dryer wherein the receiver dryer includes a canister having a longitudinally-extending cylindrical sidewall, a closure member secured to one end of said sidewall and an opening at another end of said sidewall; and a first baffle in fluid-tight surrounding relation to a desiccant tube assembly, comprising the steps of:
   inserting the desiccant tube assembly and the first baffle into the canister through the open end, with a first surface of said baffle facing said closed end of said canister and said periphery of said first baffle being closely received in said canister;
   locating loose desiccant in said canister, said loose desiccant being supported by a second surface of said first baffle; inserting a second baffle with at least one opening over the desiccant tube assembly, with the desiccant tube assembly being received in said at least one opening in the second baffle, and a first surface of the second baffle supporting the loose desiccant material and said periphery of said second baffle being closely received in said canister;
   inserting a pair of tubes through at least one conduit in the desiccant tube assembly, one of said tubes being fluidly connected to an opening in the closed end of the canister, said desiccant tube assembly and said tubes having a fluid-tight seal; and
   attaching an end cap to the open end of said canister, said end cap having at least one fluid flow opening extending through the end cap, one of said tubes being fluidly connected to the opening in the end cap.

33. The method as in claim 32, wherein the desiccant tube assembly has a pair of desiccant tubes, and further comprising the steps of inserting a first tube into one of the tubes of the desiccant tube assembly, said first tube being fluidly connected to an opening in the closed end of the canister, said desiccant tube assembly and said first tube having a fluid-tight seal; and inserting a second tube within the other of the tubes of the desiccant tube assembly, the second tube having a fluid-tight seal with the other tube of the desiccant tube assembly.

34. The method as in claim 32, wherein said first tube is secured to said closed end prior to the desiccant being introduced into the canister, and said end cap is secured to said canister after the desiccant is introduced into the canister.

* * * * *